(12) United States Patent
Johnson

(10) Patent No.: US 6,608,574 B1
(45) Date of Patent: Aug. 19, 2003

(54) DEVICE, SYSTEM, AND METHOD FOR COMPENSATING FOR ISOLATION AND CABLE DELAYS IN AN SSI ENCODER INTERFACE CIRCUIT

(75) Inventor: Charles Johnson, Gray, TN (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 10/112,132

(22) Filed: Mar. 29, 2002

(51) Int. Cl.[7] ............................................... H03M 1/48
(52) U.S. Cl. ....................................... 341/116; 341/131
(58) Field of Search ................................. 341/118, 116; 327/292; 375/374

(56) References Cited

U.S. PATENT DOCUMENTS

| | | | |
|---|---|---|---|
| 5,721,546 A | * | 2/1998 | Tsutsumishita ............. 341/116 |
| 6,229,368 B1 | * | 5/2001 | Lee ............................. 327/292 |
| 6,327,318 B1 | * | 12/2001 | Bhullar et al. ............... 375/374 |

* cited by examiner

Primary Examiner—Peguy Jeanpierre
Assistant Examiner—Joseph Lauture

(57) ABSTRACT

At least one exemplary embodiment of the present invention includes a method for compensating for delays in a circuit of a serial encoder. The method includes determining at least one delay associated with the circuit of the serial encoder. The method also includes adjusting an internal clock signal received by a data receiving memory associated with the serial encoder to account for the at least one determined delay.

27 Claims, 4 Drawing Sheets

DEVICE, SYSTEM, AND METHOD FOR COMPENSATING FOR ISOLATION AND CABLE DELAYS IN AN SSI ENCODER INTERFACE CIRCUIT

BACKGROUND

The present invention relates to the field of process automation and control, and, more particularly, to a device, system, and method for compensating for delays in a serial encoder interface circuit.

Encoders are measuring systems that can detect rotational and linear positions of machines such as servomotors, linear actuators, tachometers, and the like, which can allow accurate positioning of such machines, and determination of such quantities as velocity and acceleration. Encoders can be used in conjunction with control systems such as programmable logic control (PLC) and computer numerical control (CNC) systems, as well as various drive systems.

Many different types of encoders are available for such purposes. For example, a differentiation is frequently made between incremental and absolute encoders. Incremental encoders can generate a defined number of steps (increments) per revolution, which are processed in the control system. Absolute value encoders can provide, directly after the control system is powered-up, the absolute position value without the machine moving. The absolute position can be determined by opto-electronically scanning several code tracks. Single-turn encoders can sense the absolute position within a revolution, while multi-turn encoders, additionally can code the number of revolutions. Examples of applications for absolute encoders include machine tools, textile machinery, printing presses, wood working machines, handling technology, conveying and storage technology, and/or robotics.

The position information obtained by an encoder can be transferred to the control system via, for example, a Synchronous Serial Interface (SSI) or a drive bus. An SSI encoder circuit can utilize one or more gated clock pulse bursts, or even a stream of gated clock pulse bursts, to latch data regarding a current linear or rotational position of the machine and cause the position data to be shifted out of the encoder to a receiving shift register (a type of memory). The pulse bursts can enable the encoder to identify when to latch the position and when to shift each position bit to the receiving shift register. The clock generator also can send pulse bursts directly to the receiving shift register to identify when to expect position data from the encoder.

FIG. 1 is a logical circuit diagram of a known embodiment of an encoder interface circuit 100. Clock generator 110 can provide a gated clock pulse signal 101 through an isolation device 120, a driver 130, and a cable 140 to an encoder 150, such as an SSI encoder. Clock generator 110 also can provide a gated clock pulse signal 102 directly to receiving shift register 190 (a memory device). Upon receipt of an appropriate clock signal, position data 103 can be sent from encoder 150 through cable 160, receiver 170, and isolation device 180 to receiving shift register 190, which can accept the position data for further processing by a processor (not shown).

Many of the components of circuit 100 can have associated delays, which can be designated by the Greek symbol tau, but are herein designated by the Roman letter T with various subscripts. For example, isolation devices 120, 180 can have isolation delays $T_i$, driver 130 can have driver delay $T_d$, cables 140, 160 can have cable delays $T_c$, encoder 150 can have a response time delay $T_e$, receiver 170 can have a receiver delay $T_r$, and receiving shift register 190 can have a set-up time delay $T_{su}$. Moreover, these delays can limit the responsiveness of the control and/or measurement system of which the circuit is a part. As pressures to increase the responsiveness of these systems rise, the impact of these delays becomes increasingly significant.

SUMMARY

At least one exemplary embodiment of the present invention includes a method for compensating for delays in a circuit of a serial encoder. The method includes determining at least one delay associated with the circuit of the serial encoder. The method also includes adjusting an internal clock signal received by a data receiving memory associated with the serial encoder to account for the at least one determined delay.

At least one exemplary embodiment of the present invention includes a method for increasing a responsiveness of an encoder circuit. The method includes increasing a frequency of an internal clock signal for the encoder circuit in response to a predetermined delay of the internal clock signal as received by a data receiving memory of the encoder circuit.

At least one exemplary embodiment of the present invention includes a method for compensating for delays in a circuit of a serial synchronous interface (SSI) encoder interface. The method includes receiving a value of at least one delay associated with the circuit of the SSI encoder interface. The method also includes delaying a clock signal received by a data memory of the circuit by no more than the received delay value, and decreasing a period of the clock signal by no more than the received delay value.

At least one exemplary embodiment of the present invention includes a method for compensating for delays in a circuit of an absolute encoder interface. The method includes receiving a value of at least one delay associated with the circuit of the absolute encoder interface. The method also includes delaying a clock signal received by a data memory of the circuit by no more than the received delay value, and decreasing a period of the clock signal by no more than the received delay value.

BRIEF DESCRIPTION OF THE DRAWINGS

The invention and its wide variety of potential embodiments will be more readily understood through the following detailed description, with reference to the accompanying drawings in which.

DETAILED DESCRIPTION

Figure 1:
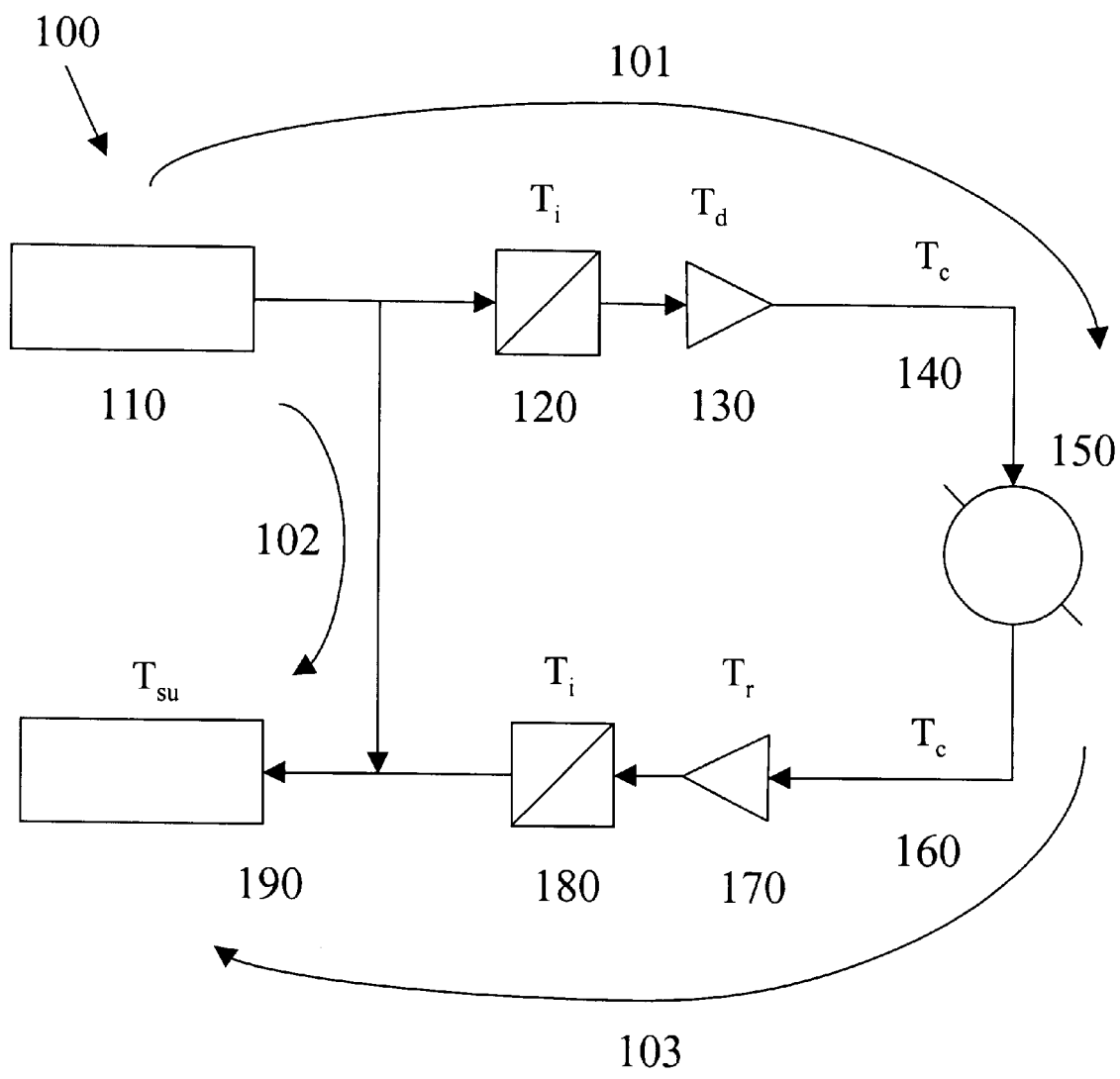
FIG. 1 is a logical circuit diagram of a known embodiment of an encoder interface circuit 100.

Referring again to FIG. 1, applicants have discovered that for circuit 100, the maximum frequency $f_{clock}$ of the signal from clock generator 110 must be less than the inverse of the sum of the delays associated with the circuit, if position is to be read correctly. This concept can be mathematically presented as:

$$f_{clock} <= 1/(2T_i + T_d + 2T_c + T_e + T_r + T_{su})$$  Equation 1:

Thus, for practical reasons, the maximum clock frequency is limited by the delays of the circuit. Upon discovering this limitation, applicants further discovered several innovative solutions.

Figure 2:
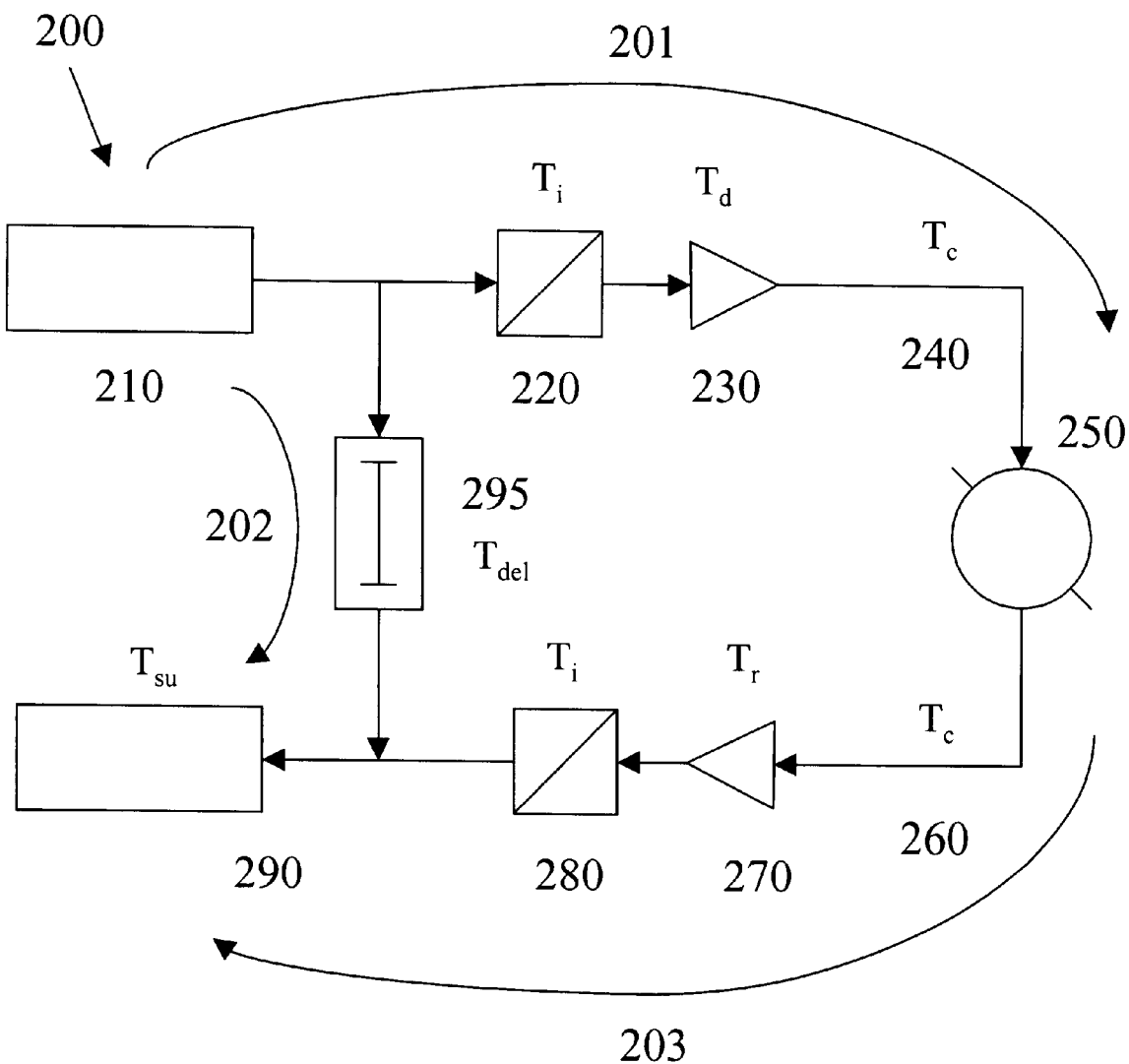
FIG. 2 is a logical circuit diagram of an exemplary embodiment of an encoder interface circuit 200 of the present invention.

FIG. 2 is a logical circuit diagram of an exemplary embodiment of an encoder interface circuit 200 of the present invention. Encoder interface 200 can be similar to the encoder interface circuit 100 of FIG. 1. For example, clock generator 210 can provide a gated clock pulse stream 201 through an isolation device 220, a driver 230, and a cable 240 to an encoder 250, such as an SSI position encoder. Position data 203 can be sent from encoder 250 through cable 260, receiver 270, and isolation device 280 to receiving shift register 290 (a memory device), which can output the position data as requested by a processor (not shown), such as for example, the Siemens FM352-5 Boolean Processor module.

In addition, a delay mechanism 295 can be provided that causes an innovative delay $T_{del}$ in the clock signal 202 received by receiving shift register 290. By providing $T_{del}$, the maximum frequency of the signal from clock generator 210 now must be less than the inverse of the sum of the delays of Equation 1, minus $T_{del}$, if position is to be read correctly. This innovative concept can be mathematically presented as:

$$f_{clock} <= 1/(2T_i + T_d + 2T_c + T_e + T_r + T_{su} - T_{del})$$  Equation 2:

Thus, the larger $T_{del}$ becomes without exceeding the sum of the uncompensated delays listed in the denominator of equation 1, the smaller the clock's period can become (and thus the more the clock frequency can be increased), at least until other factors become dominant (such as cable attenuation, driver limits, receiver limits, encoder maximum clock, etc.). That is, the period of the clock can be decreased by up to $T_{del}$.

Therefore, by intentionally delaying the clock signal received by receiving shift register 290 to account for one or more delays in the receipt of data by receiving shift register 290, the speed (i.e., clock frequency) at which circuit 200 operates can be increased. As provided by delay mechanism 295, $T_{del}$ can be the sum of several types of delays. For example, delay mechanism 295 can provide at least one constant delay to compensate for constant (or minimum) circuit or cable delays. Also, delay mechanism 295 can provide a temperature dependent variable delay to compensate for any temperature effects on circuitry delays. Further, delay mechanism 295 can provide a user or computer controllable variable delay to compensate for any installation dependent delays (e.g., cable length delays).

Figure 3:
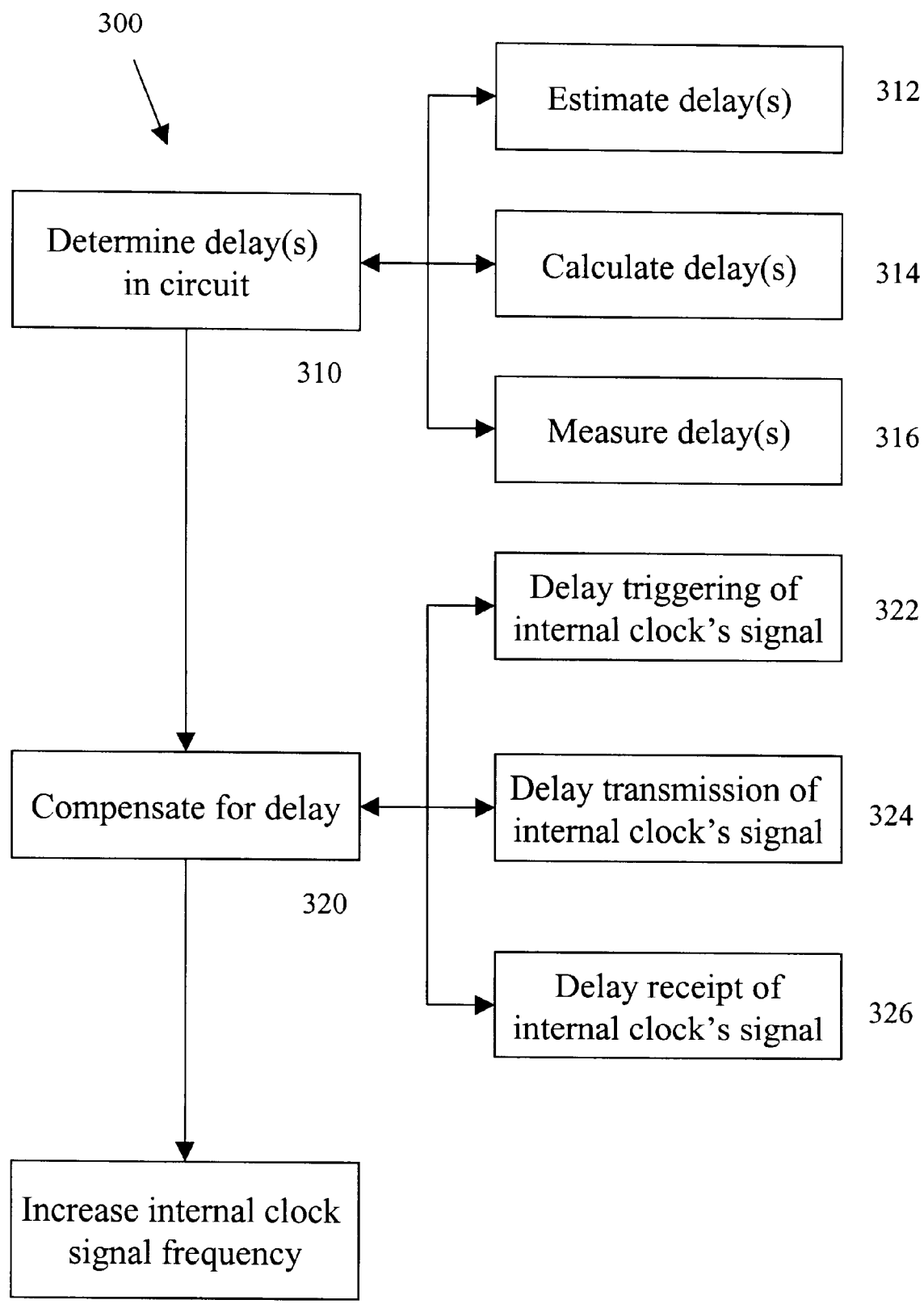
FIG. 3 is a flow diagram of an exemplary embodiment of a method 300 of the present invention.

FIG. 3 is a flow diagram of an exemplary embodiment of a method 300 of the present invention. At activity 310, one or more delays in an encoder circuit can be determined in any of several manners. For example, one or more delays can be estimated as shown at activity 312, calculated as shown at activity 314, and/or measured as shown at activity 316.

At activity 320, an adjustment and/or compensation can be provided to account for one or more of the circuitry delays. For example, as shown at activity 322, the triggering of the internal clock's signal can be delayed. This can be accomplished by utilizing a delayable and higher frequency triggering clock that triggers the internal clock's signal. As shown at activity 324, the transmission of the internal clock's signal can be delayed. As shown at activity 326, the reception of the internal clock's signal can be delayed. Such signal delays can be provided by, for example, a phase lock loop (PLL), a delay lock loop (DLL), a delay cell, and/or any delay circuit described in U.S. Pat. No. 6,353,349 (Kwon), which is incorporated herein by reference in its entirety.

At activity 330, once one or more of the circuitry delays have been accounted for, the frequency of the internal clock signal can be increased, subject to equation 2.

Figure 4:
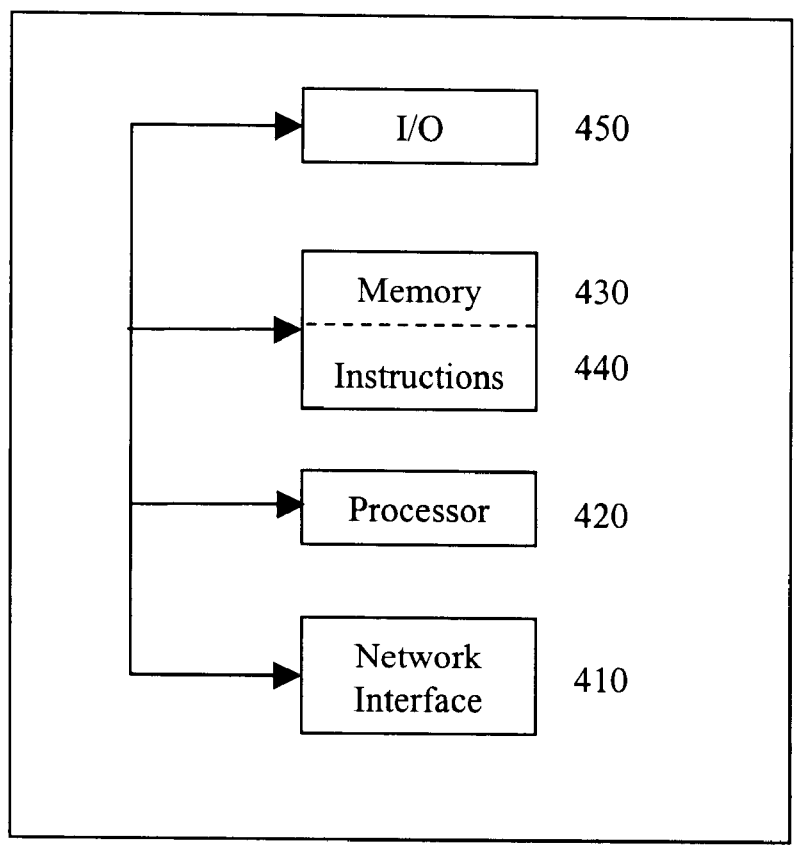
FIG. 4 is a block diagram of an exemplary embodiment of a typical information device 400.

FIG. 4 is a block diagram of an exemplary embodiment of a typical information device 400. Information device 400 can include well-known components such as one or more network interfaces 410, one or more processors 420, one or more memories 430 containing instructions 440, and/or one or more input/output ("I/O") devices 450.

In one exemplary embodiment, network interface 410 can be a telephone, a traditional data modem, a fax modem, a cable modem, a digital subscriber line interface, a bridge, a hub, a router, or other similar devices.

In one exemplary embodiment, processor 420 can be a general-purpose microprocessor, such a Pentium series microprocessor manufactured by the Intel Corporation of Santa Clara, Calif. In another embodiment, the processor can be an Application Specific Integrated Circuit (ASIC), which has been designed to implement in its hardware and/or firmware at least a part of a method in accordance with an embodiment of the present invention.

In one exemplary embodiment, memory 430 can be coupled to a processor 420 and can store instructions 440 adapted to be executed by processor 420 according to one or more activities of method 300. Memory 430 can be any device capable of storing analog or digital information, such as a hard disk, Random Access Memory (RAM), Read Only Memory (ROM), flash memory, a compact disk, a magnetic tape, a floppy disk, etc., and any combination thereof.

In one exemplary embodiment, instructions 440 can be embodied in software, which can take any of numerous forms that are well known in the art. In one exemplary embodiment, I/O device 450 can be an audio and/or visual device, including, for example, a monitor, display, keyboard, keypad, touch-pad, pointing device, microphone, speaker, video camera, camera, scanner, and/or printer, etc., and can include a port to which an I/O device can be attached, connected, and/or coupled.

Still other advantages and embodiments of the present invention will become readily apparent to those skilled in this art from the above-recited detailed description of certain exemplary embodiments. Accordingly, the drawings and descriptions are to be regarded as illustrative in nature, and not as restrictive.

For example, in an alternative embodiment of method 300, the frequency of the internal clock signal can be maintained, yet additional delays can be introduced into the circuit if $T_{del}$ is increased to account for those additional delays. For example, cable length can be extended (thereby enlarging cable delays), shift register set-up time can be increased, and/or isolation delays can grow.

What is claimed is:

1. A method for compensating for delays in a circuit of a serial encoder, comprising the activities of:
   determining at least one delay associated with the circuit of the serial encoder; and
   adjusting an internal clock signal received by a data receiving memory associated with the serial encoder to account for the at least one determined delay.

2. The method of claim 1, further comprising estimating a delay associated with the circuit of the serial encoder.

3. The method of claim 1, further comprising measuring a delay associated with the circuit of the serial encoder.

4. The method of claim 1, wherein an internal clock is delayed by the at least one delay.

5. The method of claim 1, further comprising triggering a signal of an internal clock to account for the at least one determined delay.

6. The method of claim 1, further comprising triggering a signal of an internal clock via a triggering clock having a higher frequency than the internal clock.

7. The method of claim 1, further comprising delaying a triggering signal sent to an internal clock from a triggering clock.

8. The method of claim 1, further comprising delaying an internal clock by the at least one determined delay.

9. The method of claim 1, further comprising delaying the internal clock signal sent from an internal clock by the at least one determined delay.

10. The method of claim 1, further comprising delaying the internal clock signal sent to the data receiving memory from an internal clock by the at least one delay.

11. The method of claim 1, further comprising increasing a frequency of the internal clock signal in response to said adjustment of the internal clock signal received by the data receiving memory associated with the serial encoder.

12. The method of claim 1, wherein the data receiving memory is a register.

13. The method of claim 1, wherein the data receiving memory is a shift register.

14. The method of claim 1, wherein the at least one determined delay is a cable delay.

15. The method of claim 1, wherein the at least one determined delay is an isolation delay.

16. The method of claim 1, wherein the at least one determined delay is a cable delay.

17. The method of claim 1, wherein the at least one determined delay is an encoder response time.

18. The method of claim 1, wherein the at least one determined delay is a driver delay.

19. The method of claim 1, wherein the at least one determined delay is a receiver delay.

20. The method of claim 1, wherein the at least one determined delay is a constant delay.

21. The method of claim 1, wherein the at least one determined delay is a variable delay.

22. The method of claim 1, wherein the at least one determined delay is a temperature-dependent delay.

23. A computer-readable medium containing instructions for activities comprising:

determining at least one delay associated with the circuit of the serial encoder; and adjusting an internal clock signal received by a data receiving memory associated with the serial encoder to account for the at least one determined delay.

24. A system for compensating for delays in a circuit of a serial encoder, comprising:

means for determining at least one delay associated with the circuit of the serial encoder; and means for adjusting an internal clock signal received by a data receiving memory associated with the serial encoder to account for the at least one determined delay.

25. A method for increasing a responsiveness of an encoder circuit, comprising decreasing a period of an internal clock signal for the encoder circuit by no more than a predetermined delay of the internal clock signal as received by a data receiving memory of the encoder circuit.

26. A method for compensating for delays in a circuit of a serial synchronous interface (SSI) encoder interface, comprising the activities of:

receiving a value of at least one delay associated with the circuit of the SSI encoder interface;

delaying a clock signal received by a data memory of the circuit by no more than the received delay value; and decreasing a period of the clock signal by no more than the received delay value.

27. A method for compensating for delays in a circuit of an absolute encoder interface, comprising the activities of:

receiving a value of at least one delay associated with the circuit of the absolute encoder interface; and delaying a clock signal received by a data memory of the circuit by no more than the received delay value; and decreasing a period of the clock signal by no more than the received delay value.

* * * * *